(12) United States Patent
Abdelhameed et al.

(10) Patent No.: US 12,430,196 B2
(45) Date of Patent: Sep. 30, 2025

(54) MONITORING A TIME SCHEDULE OF A FIRST THREAD RUNNING ON A CONTROL UNIT

(71) Applicant: Bayerische Motoren Werke Aktiengesellschaft, Munich (DE)

(72) Inventors: Mohamed-Saad Abdelhameed, Dachau (DE); Manjeet Singh Bilra, Hoerlkofen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 59 days.

(21) Appl. No.: 18/564,128

(22) PCT Filed: Apr. 29, 2022

(86) PCT No.: PCT/EP2022/061462
§ 371 (c)(1),
(2) Date: Nov. 27, 2023

(87) PCT Pub. No.: WO2022/248156
PCT Pub. Date: Dec. 1, 2022

(65) Prior Publication Data
US 2024/0272977 A1    Aug. 15, 2024

(30) Foreign Application Priority Data

May 28, 2021    (EP) ..................................... 21176509

(51) Int. Cl.
*G06F 11/00*    (2006.01)
*G06F 11/07*    (2006.01)

(52) U.S. Cl.
CPC ...... *G06F 11/0772* (2013.01); *G06F 11/0757* (2013.01)

(58) Field of Classification Search
CPC ............. G06F 11/0757; G06F 11/0739; G06F 11/3013
See application file for complete search history.

(56) References Cited

U.S. PATENT DOCUMENTS

| 2004/0003312 A1* | 1/2004 | Smith ................. | G06F 21/6218 |
| | | | 714/38.13 |
| 2006/0075304 A1* | 4/2006 | Canning ............. | G06F 11/0748 |
| | | | 714/38.11 |

(Continued)

OTHER PUBLICATIONS

International Search Report (PCT/ISA/210) issued in PCT Application No. PCT/EP2022/061462 dated Jul. 15, 2022 (2 pages).

(Continued)

*Primary Examiner* — Philip Guyton
(74) *Attorney, Agent, or Firm* — Crowell & Moring LLP

(57) ABSTRACT

Provided is a method for monitoring a time schedule of a first thread running on a control unit of an automated vehicle. The method includes a step of providing, to a second thread, a first timestamp corresponding to a starting time of the first thread, and a step of providing, to the second thread, a second timestamp corresponding to an end time of the first thread. The method further includes a step of computing, by use of the second thread, a difference between the first timestamp and the second timestamp, and a step of comparing, by use of the second thread, the computed difference to a predefined threshold for monitoring the time schedule of the first thread.

7 Claims, 1 Drawing Sheet

(56) References Cited

U.S. PATENT DOCUMENTS

| | | | | |
|---|---|---|---|---|
| 2009/0105989 | A1* | 4/2009 | Ramacher | H04L 41/0681 |
| | | | | 702/183 |
| 2012/0159259 | A1* | 6/2012 | Klein | G06F 11/3419 |
| | | | | 714/E11.21 |
| 2013/0080502 | A1* | 3/2013 | Mccoll | G06F 11/0715 |
| | | | | 709/224 |
| 2013/0339984 | A1* | 12/2013 | Grumann | G06F 11/0757 |
| | | | | 719/318 |
| 2016/0216704 | A1* | 7/2016 | Koh | G06F 11/0736 |
| 2017/0088164 | A1* | 3/2017 | Kobayashi | G06F 11/0757 |
| 2018/0105183 | A1* | 4/2018 | Kollmer | G06F 11/0739 |
| 2018/0365092 | A1* | 12/2018 | Linetskiy | G06F 11/079 |
| 2020/0225952 | A1* | 7/2020 | Bajaj | G06F 9/30076 |
| 2024/0036969 | A1* | 2/2024 | Feng | G06F 11/0715 |
| 2024/0059301 | A1* | 2/2024 | Bertrand | G06F 11/1641 |

OTHER PUBLICATIONS

Written Opinion (PCT/ISA/237) issued in PCT Application No. PCT/EP2022/061462 dated Jul. 15, 2022 (7 pages).
European Search Report issued in European Application No. 21176509.4 dated Dec. 2, 2021 (11 pages).
"Specification of Watchdog Manager", AUTOSAR CP Release 4.3.1, Dec. 8, 2017, pp. 1-131, XP055865296 (131 pages).
Pintard, L.; "From safety analysis to experimental validation by fault injection—Case of automotive embedded systems", Jan. 1, 2015, pp. 1-147, Institut National Polytechnique de Toulouse, XP055711353 (147 pages).
Sigrist, L. et al.; "Mixed-Criticality Runtime Mechanisms and Evaluation on Multicores", 21st IEEE Real-Time and Embedded Technology and Applications Symposium, Apr. 13, 2015, pp. 194-205, XP032777176 (12 pages).

* cited by examiner

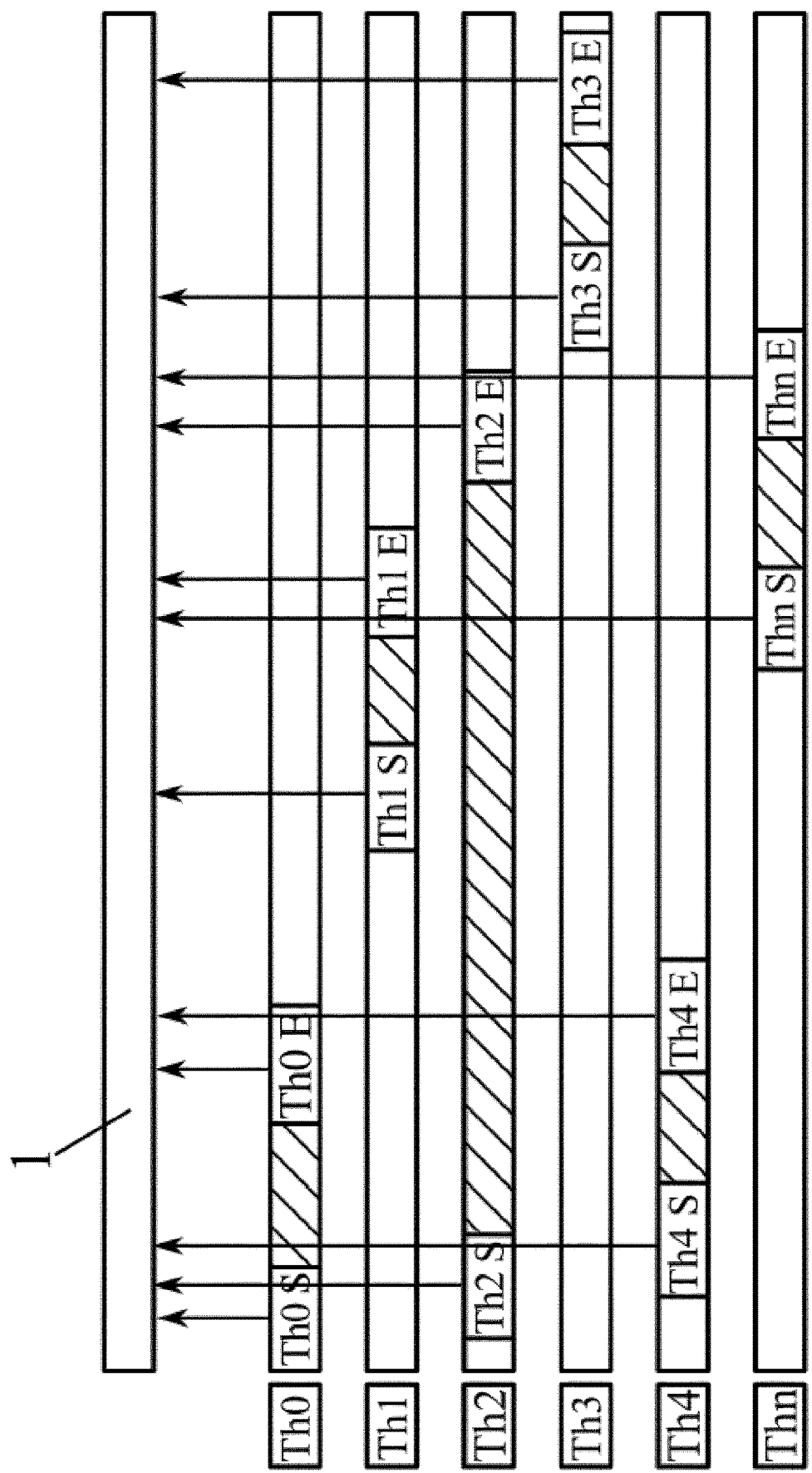

MONITORING A TIME SCHEDULE OF A FIRST THREAD RUNNING ON A CONTROL UNIT

BACKGROUND AND SUMMARY

The present invention relates to a method for monitoring a time schedule of a first thread running on a control unit of an automated vehicle, and to a control unit configured to carry out the method.

For an automated or autonomous vehicle, e.g., a car, there is a lot of data processing including perception from multiple sensors. The data processing may be done on multiple cores of an electronic control unit (ECU) thereby taking the data from the sensors as an input and processing the data before sending the data to the vehicle.

The background of the invention is with respect to safety critical data processing on multi core electronic control units (ECUs) using the Adaptive AUTOSAR and/or the Linux platform which both enable large data processing, but is not limited thereto.

In general, for autonomous or automated vehicles it is important that heterogeneous sensors may be used together, e.g., for sensor data fusion in order to compute an environmental model of the vehicle to be used for planning a trajectory of the vehicle.

These data, i.e., information, often need to be processed by a control unit in real time to ensure a correct sensor data fusion.

By multi core and/or multi thread data processing, e.g., using the Adaptive AUTOSAR or the Linux System, no deterministic scheduling of threads is provided.

Hence, due to dynamic scheduling some of the threads may be interrupted by other higher priority thread from some other thread running in parallel resulting in a delay in the system.

Such delays could range from a certain length of time (e.g., a number of milliseconds) to indefinite and may therefore violate the functional safety by overrunning a maximum allowable delay/inaccuracy of the system for autonomous or automated, e.g., highly automated, vehicles. There might also be sporicidal jumps or execution of different threads which may not complaint with the sequence of execution of threads.

Against the background of this prior art, the thread of the present invention is to provide a device and/or a method which is/are suitable for overcoming at least the above-mentioned disadvantages of the state of the art.

The object is solved by the features of the independent claims. The dependent claims have preferred further embodiments of the invention as their subject matter.

More specifically, the object is solved by a method for monitoring a time schedule of a first thread running on a control unit of an automated vehicle.

The time schedule may be a dynamic time schedule. The control unit may use, i.e., comprise, the AUTOSAR, the Adaptive AUTOSAR and/or the Linux platform. Especially in case of the Adaptive AUTOSAR and/or the Linux platform, the time schedule may allow multi core and/or multi thread processing.

AUTOSAR in general uses a three-layer architecture including a basic or base software layer (BSW), a Run-Time Environment (RTE) and an application software layer (ASW). The BSW comprises standardized software modules (mostly) without a functional thread, which provide services necessary to run the functional part of the upper software layers. The RTE is a middleware that abstracts from the network topology for inter- and intra-ECU information exchange between application software components and between the BSW and the ASW. The ASW comprises application software components that interact with the RTE.

More specifically, the AUTOSAR Classic platform architecture distinguishes three software layers running on a microcontroller at the highest level of abstraction: ASW, RTE and BSW. The ASW is largely hardware-independent. Communication between software components and access to BSW is done through RTE, which is the complete interface for applications. BSW is divided into three main layers and complex drivers: Services, ECU abstraction and microcontroller abstraction. The services are also divided into functional groups that provide the infrastructure for system, memory, and communication services. A key concept of the AUTOSAR Classic platform is the Virtual Functional Bus (VFB). This virtual bus is an abstract set of RTEs and decouples applications from the infrastructure. Communication takes place via dedicated ports, i.e., the communication interfaces of the application software must be mapped to these ports. The VFB handles the communication within the individual ECUs and between the ECUs. From an application perspective, no detailed knowledge of lower level technologies or dependencies is required. This supports hardware-independent development and use of application software.

New use cases required the development of the AUTOSAR Adaptive Platform. One example of such a use case is inter alia highly automated driving, where the driver temporarily and/or partially transfers responsibility for driving to the vehicle. This requires, for example, communication with traffic infrastructure (e.g., traffic signs and lights), cloud backends (e.g., access to the latest traffic information or map data), or the use of microprocessors and high-performance computing hardware for parallel processing (e.g., GPUs). In addition, Car-2-X applications require interaction with vehicles and off-board systems. This means that the system must provide secure on-board communication, support for cross-domain computing platforms, smartphone integration, integration of non-AUTOSAR systems, etc. Cloud-based services also require dedicated security measures such as secure cloud interaction and right-of-way for emergency vehicles. They enable remote and distributed services, such as remote diagnostics, over-the-air (OTA) updates, repair and replacement. The core of the AUTOSAR Adaptive Platform is an operating system based on the POSIX standard. The operating system can be used by the application over a subset of POSIX as defined in IEEE1003.13 (namely PSE51). One of the main features of the AUTOSAR Adaptive Platform is service-oriented communication. Two types of interfaces are available for the Adaptive Platform: Services and Application Programming Interfaces (APIs). The platform consists of functional clusters grouped into services and the AUTOSAR Adaptive Platform base. The AUTOSAR Adaptive Platform includes both specification and code.

The method comprises a step of providing, to a second thread, a first timestamp corresponding to a starting time of the first thread, and a step of providing, to the second thread, a second timestamp corresponding to an end time of the first thread.

The method further comprises a step of computing, by use of the second thread, a difference between the first timestamp and the second timestamp, and a step of comparing, by use of the second thread, the computed difference to a predefined threshold for monitoring the time schedule of the first thread.

Additionally or alternatively, the method may further comprise a step of providing, to a third thread, the first timestamp and a step of providing, to the third thread, the second timestamp.

The method may further comprise a step of computing, by use of the third thread, a difference between the first timestamp and the second timestamp, and a step of comparing, by use of the third thread, the computed difference to the predefined threshold for monitoring the time schedule of the first thread.

The first thread may be called thread to be monitored, and the second thread may be called monitoring thread.

Additionally or alternatively, the method may further comprise a step of raising an error flag by use of the second thread and/or the third thread in case a result of the comparison is that the computed difference is beyond, above and/or outside a predefined range around the predefined threshold.

The second thread and/or third thread may run on the same control unit, optionally on the same and/or a different core of the same control unit, and/or on a different control unit than the first thread.

The control unit may comprise a shared memory being accessible by the first, the second and/or the third thread.

Additionally or alternatively, the step of providing the first timestamp to the second thread may comprise saving, by use of the first thread, the first timestamp in the shared memory and reading, by use of the second and/or the third thread, the saved first timestamp from the shared memory.

Additionally or alternatively, the step of providing the second timestamp to the second thread may comprise saving, by use of the first thread, the second timestamp in the shared memory and reading, by use of the second and/or third thread, the saved second timestamp from the shared memory.

The control unit may comprise a hardware counter.

Additionally or alternatively, the first timestamp may be generated, optionally by use of the first thread, based on a value of the hardware counter at the starting time of the first thread.

Additionally or alternatively, the second timestamp may be generated, optionally by use of the first thread, based on a value of the hardware counter at the end time of the first thread. Wherein the hardware counter may have at least ASIL B integrity to ensure there are no unintended time jumps or time delays due to E/E (end-to-end communication) failures.

The method may further comprise comparing the first timestamp and the second timestamp used in the second thread with the first timestamp and the second timestamp used in the third thread, respectively.

The method may further comprise raising an error flag if a difference between the first timestamp and the second timestamp used in the second thread and the first timestamp and the second timestamp used in the third thread exceeds a predefined threshold.

More specifically, all the timestamps may be stored, optionally (inverse) redundantly, in the second and the third thread. Both the second and the third thread may be implemented in a safe partition of the control unit to ensure a freedom from interference. The redundant data may be used for plausibilisation by comparing the first timestamp of the first thread used in the second thread with the first timestamp of the first thread used in the third thread and/or the second timestamp of the first thread used in the second thread with the second timestamp of the first thread used in the third thread, e.g., to ensure ASIL D.

The method may further comprise monitoring of a starting time of the second thread and an end time of the second thread.

More specifically, by monitoring a first timestamp of the second thread provided at a start time of the second thread and a second timestamp of the third thread provided at an end time of the second thread, it may be ensured that all the other threads between the second and the third thread are completed without any thread delay/thread overrun or no thread jumps according to a predetermined schedule of threads.

In the following, the above given abstract description is summarized in other words and concretized. As described above, the control unit is preferably an electronic control unit (ECU) being based on an AUTOSAR Adaptive platform or Linux platform and comprises multiple cores. Therefore, the terminology used in the following description is based on the AUTOSAR Adaptive/Linux Platform standard.

Before initializing, the (application) thread, above called first thread, shall do timestamping from the local hardware (HW) counter of the control unit. According to the time schedule, the thread is allowed to run for a given time. After completion of the thread, again one more timestamp is taken just after the execution of the thread is completed.

So each thread could have at least two timestamps, i.e., one at the start of execution of the thread (so called first timestamp) and one at the end of execution of the thread (so called second timestamp).

Here, a monitoring mechanism is provided to monitor the timestamps similar to a deadline/alive monitor which ensures that the application thread is completed after the permissible time and that an overrun and/or delay of the thread could be detected.

In the adaptive AUTOSAR/Linux platform/scheduler, a shared buffer, e.g., a POSIX shared memory buffer, is provided which is used to write the timestamps during the starting of execution of a single thread maintaining the integrity of the read and write operations (e.g., using semaphores or disabling interrupts).

After execution of the thread, one more timestamp is taken (as explained above) to ensure that the thread is completed, wherein this timestamp may also be written in the shared memory buffer.

One thread, preferably at least two threads, are provided for monitoring the execution sequence, execution time, deadline monitoring and/or alive monitoring for all the threads at the given time in the dynamic scheduler. The at least two threads can also do a cross-check to ensure safety integrity of all monitoring threads.

The monitoring could be implemented as one class where different objects of this class could do monitoring for each individual threads, i.e., each thread acting as a class could create different objects based on this monitoring class. This monitoring class may be developed according ASIL Integrity of the item.

The capability to monitor could also be extended to each thread of the scheduler, where each thread has to monitor all the other threads other that itself and report it to the scheduler, e.g., by raising an error flag.

Furthermore, a control unit, optionally an electronic control unit (ECU), is provided, wherein the control unit is configured to carry out the above described method at least partly.

The above given description with respect to the method applies mutatis mutandis to the control unit and vice versa.

An embodiment is described below with reference to FIG. 1.

BRIEF DESCRIPTION OF THE DRAWING

FIG. 1 depicts schematically a time schedule of multiple threads running on a control unit of an automated vehicle.

DETAILED DESCRIPTION OF THE DRAWING

In FIG. 1 a time schedule of multiple application threads Th0-Thn running on an application software layer of a (not shown) control unit of an automated vehicle is depicted, as well as a shared memory 1 of the control unit, wherein the depicted time schedule corresponds to one cycle of the method. The method may be carried out cyclically, e.g., periodically.

The shared memory 1 is accessible for all threads Th0-Thn by carrying out read and/or write operations. The threads Th0 and Th3 are both so called monitoring threads configured to monitor the time schedule of the other threads Th1, Th2, Th4, Thn, respectively.

At least one of the monitoring threads Th0, Th3 may run on the same control unit as the threads to be monitored Th1, Th2, Th4, Thn, optionally on the same and/or a different core of the same control unit. At least one of the monitoring threads Th0, Th3 may run on a different control unit than the threads to be monitored Th1, Th2, Th4, Thn. Both monitoring threads Th0, Th3 are implemented in a safe partition of the control unit to ensure a freedom from interference.

By providing two monitoring threads, here Th0 and Th3, it is possible to ensure redundancy, i.e., two threads ensure double and/or crosschecking of the time schedule.

To ensure that the time schedule is correct, a method for monitoring the time schedule of the threads Th1, Th2, Th4, Thn is carried out. The aim of the method is at least to detect any delay and/or overrun of the threads to be monitored Th1, Th2, Th4, Thn. By providing two monitoring threads, here Th0 and Th3, it is also possible to ensure redundancy, i.e., two threads ensure double checking with respect to the threads to be monitored Th1, Th2, Th4, Thn, and/or crosschecking of the time schedule of the monitoring threads Th0 and Th3 itself.

The method will be explained in detail below, wherein the above-mentioned control unit is configured to carry out the method.

In a first step of the method, a start timestamp Th0 S, Th1 S, Th2 S, Th3 S, Th4 S, Thn S is generated by each one of the threads Th0-Thn, respectively. The start timestamp Th0 S, Th1 S, Th2 S, Th3 S, Th4 S, Thn S is generated when the respective thread Th0-Thn starts, i.e., at the beginning of the execution thereof, based on a value of a hardware counter of the control unit at a starting time of the respective thread Th0-Thn. The hardware counter, e.g., comprising a monotonic clock, is accessible by each one of the threads Th0-Thn, respectively.

In a second step of the method, the generated end timestamp Th0 S, Th1 S, Th2 S, Th3 S, Th4 S, Thn S is written into the shared memory 1 by the respective thread Th0-Thn.

In a third step of the method, an end timestamp Th0 E, Th1 E, Th2 E, Th3 E, Th4 E, Thn E is generated by each one of the threads Th0-Thn, respectively. The end timestamp Th0 E, Th1 E, Th2 E, Th3 E, Th4 E, Thn E is generated when the respective thread Th0-Thn ends, i.e., at the end of the execution thereof, based on a value of the hardware counter at an end time of the respective thread Th0-Thn.

In a fourth step of the method, the generated end timestamp Th0 E, Th1 E, Th2 E, Th3 E, Th4 E, Thn E is written into the shared memory 1 by the respective thread Th0-Thn.

Each one of the threads Th0-Thn carries out the first, second, third and fourth step during runtime of the respective thread Th0-Thn and during each cycle of the method, wherein the threads to be monitored Th 1, Th 2, Th 4, Thn do, for example, sensor data processing in between the second and the third step and the monitoring threads Th0, Th3 carry out, optionally additionally to do sensor data processing and/or other data processing, the steps described in detail below.

In a fifth step of the method, the start timestamps Th0 S, Th1 S, Th2 S, Th3 S, Th4 S, Thn S and the end timestamps Th0 E, Th1 E, Th2 E, Th3 E, Th4 E, Thn E available at the time of execution of the respective monitoring thread Th0, Th3 are provided to the monitoring threads Th0, Th3, respectively. Providing the timestamps to the respective monitoring threads Th0, Th3 means that the respective monitoring thread Th0, Th3 reads the timestamps from the shared memory 1.

In detail, the first monitoring thread Th0 starts at the beginning of each cycle of the method. At the beginning of each cycle, the start timestamps Th1 S, Th2 S, Th3 S, Th4 S, Thn S and the end timestamps Th1 E, Th2 E, Th3 E, Th4 E, Thn E of all the other threads Th1, Th2, Th3, Th4, Thn of the previous (not shown) cycle are saved in the shared memory 1 and are therefore available for the first monitoring thread Th0. That is, the first the first monitoring thread Th0 reads the start timestamps Th1 S, Th2 S, Th3 S, Th4 S, Thn S and the end timestamps Th1 E, Th2 E, Th3 E, Th4 E, Thn E of all the other threads Th1, Th2, Th3, Th4, Thn of the previous cycle of the method from the shared memory 1. The second monitoring thread Th3 starts at the end of each cycle of the method. At the end of each cycle the start timestamps Th0, Th1 S, Th2 S, Th4 S, Thn S and the end timestamps Th1 E, Th2 E, Th4 E, Thn E of all the other threads th0, Th1, Th2, Th4, Thn of the actual (shown) cycle are saved in the shared memory 1 and are therefore available for the second monitoring thread Th3. That is, the first the second monitoring thread Th3 reads the start timestamps Th0 S, Th1 S, Th2 S, Th4 S, Thn S and the end timestamps Th0 E, Th1 E, Th2 E, Th4 E, Thn E of all the other threads Th0, Th1, Th2, Th4, Thn of the actual cycle of the method from the shared memory 1.

In a sixth step of the method, the monitoring threads Th0, Th3 compute, using the timestamps Th0 S, Th1 S, Th2 S, Th3 S, Th4 S, Thn S, Th0 E, Th1 E, Th2 E, Th3 E, Th4 E, Thn E read from the shared memory 1 in the fifth step, a difference between the start timestamp Th0 S, Th1 S, Th2 S, Th3 S, Th4 S, Thn S and the end timestamp Th0 E, Th1 E, Th2 E, Th3 E, Th4 E, Thn E of each threads to be monitored Th1, Th2, Th4, Thn and for the other monitoring thread Th0, Th3, respectively.

In a seventh step of the method, the monitoring threads Th0, Th3 compare the computed difference or differences to a predefined threshold for monitoring the time schedule of the threads Th0-Thn, respectively.

In an eighth step of the method, the monitoring threads Th0, Th3 raise an error flag in case a result of the comparison done for each thread Th0-Thn, respectively, is that the computed difference is beyond, above and/or outside a predefined range around the predefined threshold.

In a ninth step of the method, the start timestamps Th1 S, Th2 S, Th4 S, Thn S used in the first monitoring thread Th0 are compared to the start timestamps Th1 S, Th2 S, Th4 S, Thn S used in the second monitoring thread Th3, respectively. Additionally or alternatively, the end timestamps Th1 E, Th2 E, Th4 E, Thn E used in the first monitoring thread Th0 are compared to the end timestamps Th1 E, Th2 E, Th4

E, Thn E used in the second monitoring thread Th3, respectively. If a difference between the start timestamps Th1 S, Th2 S, Th4 S, Thn S of the respective threads to be monitored Th1, Th2, Th4, Thn and/or a difference between the end timestamps Th1 E, Th2 E, Th4 E, Thn E of the respective threads to be monitored Th1, Th2, Th4, Thn exceeds a predefined threshold, an error flag is raised. The ninth step may be carried out by the first and/or the second monitoring thread Th0, Th3.

In a tenth step of the method monitoring of a starting time Th0 S of the first monitoring thread Th0 and an end time Th3 E of the second monitoring thread Th3 may be done. The tenth step may be carried out by the first and/or the second monitoring thread Th0, Th3.

REFERENCE SIGNS LIST 1 shared memory
Th0, Th3 monitoring threads
Th1, Th2, Th4, Thn threads to be monitored
Th0 S-Thn S start timestamp
Th0 E-Thn E end timestamp.

The invention claimed is:

1. A method for monitoring a time schedule of a first thread running on a control unit of an automated vehicle, the method comprising:
   providing, to a second thread, a first timestamp corresponding to a starting time of the first thread;
   providing, to the second thread, a second timestamp corresponding to an end time of the first thread;
   computing, by use of the second thread, a difference between the first timestamp and the second timestamp;
   comparing, by use of the second thread, the computed difference to a predefined threshold for monitoring the time schedule of the first thread;
   providing, to a third thread, the first timestamp and the second timestamp;
   computing, by use of the third thread, a difference between the first timestamp and the second timestamp;
   comparing, by use of the third thread, the computed difference to the predefined threshold for monitoring the time schedule of the first thread; and
   raising an error flag by use of the second thread and/or the third thread in case a result of the comparison is that the computed difference is beyond, above and/or outside a predefined range around the predefined threshold.

2. The method according to claim 1, wherein the second thread and/or third thread is/are running on the same control unit, optionally on the same and/or a different core of the same control unit, and/or on a different control unit than the first thread.

3. The method according to claim 1, wherein the control unit comprises a shared memory being accessible by the first thread and by the second and/or third thread;
   wherein providing the first timestamp to the second and/or third thread comprises saving, by use of the first thread, the first timestamp in the shared memory and reading, by use of the second and/or the third thread, the saved first timestamp from the shared memory, and/or
   wherein providing the second timestamp to the second and/or the third thread comprises saving, by use of the first thread, the second timestamp in the shared memory and reading, by use of the second and/or third thread, the saved second timestamp from the shared memory.

4. The method according to claim 1, wherein the control unit comprises a hardware counter:
   wherein the first timestamp is generated, optionally by use of the first thread, based on a value of the hardware counter at the starting time of the first thread, and/or
   wherein the second timestamp is generated, optionally by use of the first thread, based on a value of the hardware counter at the end time of the first thread.

5. The method according to claim 1, further comprising:
   comparing the first timestamp and the second timestamp used in the second thread with the first timestamp and the second timestamp used in the third thread, respectively; and
   raising an error flag if a difference between the first timestamp and the second timestamp used in the second thread and the first timestamp and the second timestamp used in the third thread exceeds a predefined threshold.

6. The method according to claim 1, further comprising monitoring of a starting time of the second thread and an end time of the second thread.

7. A control unit configured to carry out a method according to claim 1.

* * * * *